Feb. 3, 1925.
P. McLOUGHLIN
1,524,873
CHAIN TIGHTENER
Filed Nov. 6, 1923
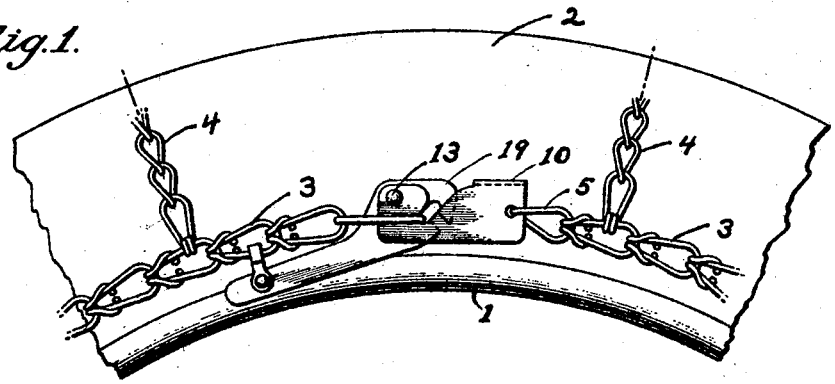
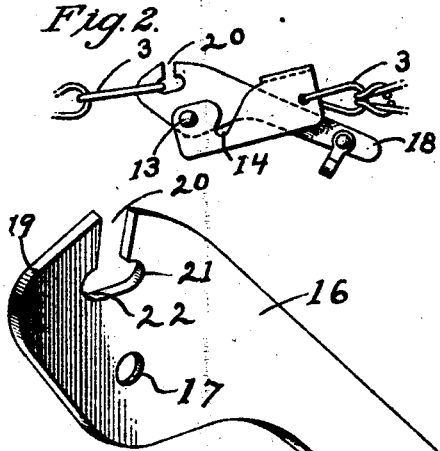
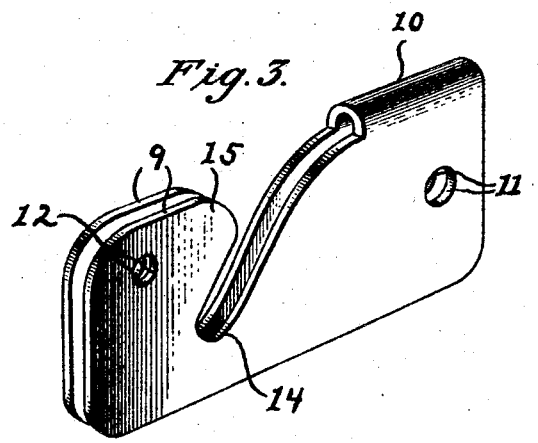
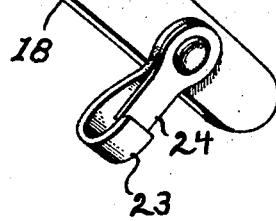
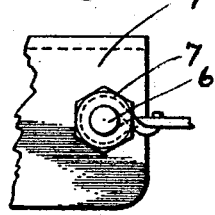
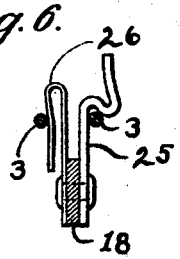
INVENTOR
P. McLOUGHLIN.
BY
H. K. Parsons
ATTORNEY Patented Feb. 3, 1925.

1,524,873

UNITED STATES PATENT OFFICE.

PATRICK McLOUGHLIN, OF WORCESTER, MASSACHUSETTS.

CHAIN TIGHTENER.

Application filed November 6, 1923. Serial No. 673,151.

*To all whom it may concern:*

Be it known that I, PATRICK McLOUGH-LIN, a British subject, residing at Worcester, in the county of Worcester and State of Massachusetts, have invented certain new and useful Improvements in Chain Tighteners, of which the following is a specification.

This invention relates to improvements in chain tighteners, and has particular reference to a novel and improved construction for application to automobile anti-skid chains which will facilitate proper application and adjustment of the tension of such chains.

Commercial skid chains in the past have comprised a pair of side members designed to lie at the sides of the tire near the rim and a plurality of cross-members connecting the side members and extending over the tread of the tire. The side members are split and provided with a hook and eye type of connection for adjustably securing the ends together. Difficulty has been experienced, however, in properly drawing the ends together with the proper tension to take up the slack and prevent the chains from becoming unduly loose and either striking against the fenders or being thrown off when in use. Realizing this difficulty, use has been made in the past of auxiliary springs or the like to hold the chains properly tightened, and special tightening tools for use in applying the chains have been designed. Also attempts have been made to embody a tightener in the attaching hook but these have been unsatisfactory due to insufficiency of the leverage provided and the absence of proper means to lock the tightening lever in closed position.

It is the object of the present invention to overcome the difficulties experienced with prior art constructions and to provide a structure which will be simple of construction and compact in form and which will operate to properly draw up and tighten the side chains the required amount to firmly but not unduly grip the tire, and which will be capable of utilization to lock the chain in tightened position and prevent accidental loosening or disengagement of the connected parts. A further object of the invention is the provision of a device which in addition to drawing the parts into interlocking or secured position may be employed to positively disengage the parts as when it is desired to remove the chains.

In the attainment of these objects, in its broad aspect the invention comprises an attaching member for application to one end of the chain, in combination with an intermediately pivoted lever carried by the attaching member, said lever having an operating position at one side of its pivot and having a hooked head at the other end for engagement with the free end of the chain to draw it into locking relation with the attaching member.

More specifically, the invention comprises a hooked attaching member which forms the fulcrum for the lever, in combination with a lever which serves to force the chain under tension into locking engagement with the hooked portion of the attaching member or out of engagement therewith as desired and which is provided with means for locking the lever and thus the chain in engaged position.

One embodiment of the principles of the invention together with a modified form of locking device is shown in the accompanying drawings, in which Figure 1 represents a side elevation of the invention in use.

Figure 2 illustrates the initial engagement of the chain by the tightening lever.

Figure 3 is a perspective view of the attaching member.

Figure 4 is a similar view of the tensing lever.

Figure 5 is a fragmentary view illustrating a different manner of securing the chain to the attaching member, and, Figure 6 is a sectional view illustrating a different locking device.

In the drawings, in which similar characters of reference denote corresponding parts in the several views, the numeral 1 designates a demountable rim bearing the tire 2 to which is applied a suitable antiskid chain structure including the side chains 3 and cross-chains 4.

Secured to one end of the side chain 3, either by a link 5 as shown in Figure 1, or by a bolt 6 and nut 7 as shown in Figure 5, is what I have termed my attaching member. This member is in the form of a doubled or folded piece of sheet metal providing the spaced side members 9—9 connected by the fold 10 and having the aligned fastener receiving apertures 11 for the side chain connection. The side members 9 are further formed with the apertures 12 to receive the fulcrum rivet 13, while adjacent said apertures they are cut away to provide the chain link engaging slot 14 and hooked retaining portion 15.

As previously mentioned, difficulty has been experienced in the past in sufficiently tensing the side chain members to engage the proper link of one end with the connection on the other end. This difficulty the present invention obviates through the provision of the chain shifting lever 16. This lever is intermediately pivoted as at 17 on the rivet 13 and has extending therefrom in one direction the elongated operating handle 18, while at the other end is the head 19 having a T-shaped slot comprising the shank portion 20 and lateral terminal portions 21—22.

In use, the attaching member is suitably secured to one end of the side chain and the chain applied in the usual manner to a tire. A link at the other end of the side chain is then passed through the slot 20 into the notch 22 as illustrated in Figure 2. Rocking of the lever on its pivot will then tense the side chain and draw the engaged link over into position to swing down into the retaining notch or slot 14 behind the hook 15, as shown in Figure 1. At the same time, the engaged link will slide in the slot of the head from the notch 22 to the notch 21, the tension of the chain tending to hold the lever in its closed position.

It will be understood that reverse rocking of the lever will cam the chain out of the slot 14 and provide a satisfactory leverage for ready releasing of the chain when desired. On the other hand, to prevent accidental disengagement of the chain link from the attaching member, the end of the lever may be provided with the hook 23 and spring keeper 24 for engagement with one of the side chain links 3 as shown in Figure 1. This device serves to positively prevent accidental swinging movement of the lever, while the solid head of the lever closing the slot 14 secures the link of the side chain in position. An alternative form of locking device for engagement with a side chain link is shown in Figure 6 and comprises a hook 25 and a spring 26 for holding the hook laterally against the link 3.

I claim:

1. In a device of the character described, the combination with an attaching member, of a pivot carried thereby, and a lever fulcrumed on the pivot having a head with a T-shaped chain engaging slot formed therein and an opposed handle portion, the attaching member having a chain receiving slot disposed in the path of movement of the slot in the head.

2. A tire chain tightening device comprising an elongated attaching member formed from sheet metal having apertures near the ends thereof, one of said apertures being adapted for engagement with a side chain and the other to receive a pivot for the tensing lever, the intermediate portion of the member having a diagonal slot formed therein for the reception of the opposite end of the tensed side chain.

PATRICK McLOUGHLIN.